US012724474B2

(12) United States Patent
Chakraborty et al.

(10) Patent No.: US 12,724,474 B2
(45) Date of Patent: Sep. 1, 2026

(54) HYBRID CORE ARCHITECTURE

(71) Applicant: Intel Corporation, Santa Clara, CA (US)

(72) Inventors: Suranjan Chakraborty, Bangalore (IN); Venkatesh Satnur, Bengaluru (IN); Anil Bindu Lingambudi, Bengaluru (IN); Ashwini Khandekar, Bengaluru (IN); Stephen H. Gunther, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/169,505

(22) Filed: Feb. 15, 2023

(65) Prior Publication Data

US 2024/0272701 A1 Aug. 15, 2024

(51) Int. Cl.

| | |
|---|---|
| ***G06F 1/32*** | (2019.01) |
| ***G06F 1/3206*** | (2019.01) |
| ***G06F 1/324*** | (2019.01) |
| ***G06F 1/3296*** | (2019.01) |

(52) U.S. Cl.

CPC .......... *G06F 1/3296* (2013.01); *G06F 1/3206* (2013.01); *G06F 1/324* (2013.01)

(58) Field of Classification Search

CPC .................................... G06F 1/32; G06F 9/44

See application file for complete search history.

(56) References Cited

U.S. PATENT DOCUMENTS

| | | | | |
|---|---|---|---|---|
| 2012/0169660 A1* | 7/2012 | Seo | ...................... | G06F 3/0446 345/174 |
| 2018/0183440 A1* | 6/2018 | Jensen | ................. | G06F 1/3237 |

OTHER PUBLICATIONS

USB 3.0 Promoter Group, "Universal Serial Bus Type-C Cable and Connector Specification", Release 2.2, Oct. 2022, 466 pages.

* cited by examiner

*Primary Examiner* — Keshab R Pandey

(74) *Attorney, Agent, or Firm* — NICHOLSON DE VOS WEBSTER & ELLIOTT LLP

(57) ABSTRACT

Systems, apparatuses and methods may provide for technology that determines a selected priority corresponding to a selected region in a microprocessor, determines an adjacent priority corresponding to an adjacent region in the microprocessor, wherein the adjacent region is adjacent to the selected region, and places the adjacent region in a first reduced power state if the selected priority is greater than the adjacent priority and temperature of the selected region is less than a selected temperature threshold associated with the selected region.

20 Claims, 8 Drawing Sheets

60

| | IP0 | | | | |
|---|---|---|---|---|---|
| | IP00 | IP01 | IP02 | IP03 | |
| IP1 IP10 | Distance (0,0) | Distance (0,1) | Distance (0,2) | Distance (0,3) | IP20 IP2 |
| IP11 | Distance (1,0) | Distance (1,1) | Distance (1,2) | Distance (1,3) | IP21 |
| IP12 | Distance (2,0) | Distance (2,1) | Distance (2,2) | Distance (2,3) | IP22 |
| IP13 | Distance (3,0) | Distance (3,1) | Distance (3,2) | Distance (3,3) | IP23 |
| | IP30 | IP31 | IP32 | IP33 | |
| | IP3 | | | | |

FIG. 3

HYBRID CORE ARCHITECTURE

TECHNICAL FIELD

Embodiments generally relate to power management. More particularly, embodiments relate to technology to control power and temperature based on the relative priority of different operating regions in a hybrid core architecture.

BACKGROUND OF THE DISCLOSURE

Modern-day microprocessors may be designed with hybrid computing cores and intellectual property (IP) blocks (e.g., "IPs") such as, for example, memory regions, cache-coherent fabrics/rings, image processing units, input/output (IO, e.g., USB Type-C, Universal Serial Bus Type-C Cable and Connector Specification, Release 2.2, October 2022, USB Implementers Forum) sub-systems, security modules, etc. Each of these hybrid operating regions may include digital thermal sensor (DTS) diodes, which report temperature measurements that are used by firmware (FW) for monitoring and taking thermal action. The physical placement of the hybrid operating regions is typically a few micrometers away from one another. When a particular operating region is under heavy load, higher temperatures may result in both the operating region in question as well as neighboring/adjacent operation regions. The cross-heating of adjacent operating regions can have a negative impact on performance. Due to the close physical proximity of the IPs, the power consumption on one IP causes cross-heating on the adjacent IPs.

BRIEF DESCRIPTION OF THE DRAWINGS

The various advantages of the embodiments will become apparent to one skilled in the art by reading the following specification and appended claims, and by referencing the following drawings, in which:

FIG. 3 is an illustration of an example of a proximity data structure according to an embodiment;

DETAILED DESCRIPTION

The technology described herein leverages knowledge of the relative priority of work being handled in the operating regions (e.g., compute IP blocks, cores, etc.) within a hybrid system to create a new "IP cross heating" thermal threshold Ti for each operating region, where Ti is some value less than TjMax (e.g., maximum junction temperature). As a pre-emptive action, before an operating region reaches a temperature threshold associated with the operating region, adjacent operating regions that are a lower priority are driven to lower power consumption in an attempt to prevent the higher priority operating region from reaching a temperature where power reduction action is needed on that operating region. Additionally, when an operating region reaches a temperature at which frequency reduction is appropriate, embodiments will aggressively reduce power on high priority operating regions in addition to reducing power on the "hot" operating region. The hot operating region, which has a higher priority will get cold more quickly and can return to the desired frequency more quickly. Accordingly, the technology described herein improves the performance of affected operating regions with additional thermal headroom in the case of thermal interference from adjacent operating regions.

Figure 1:
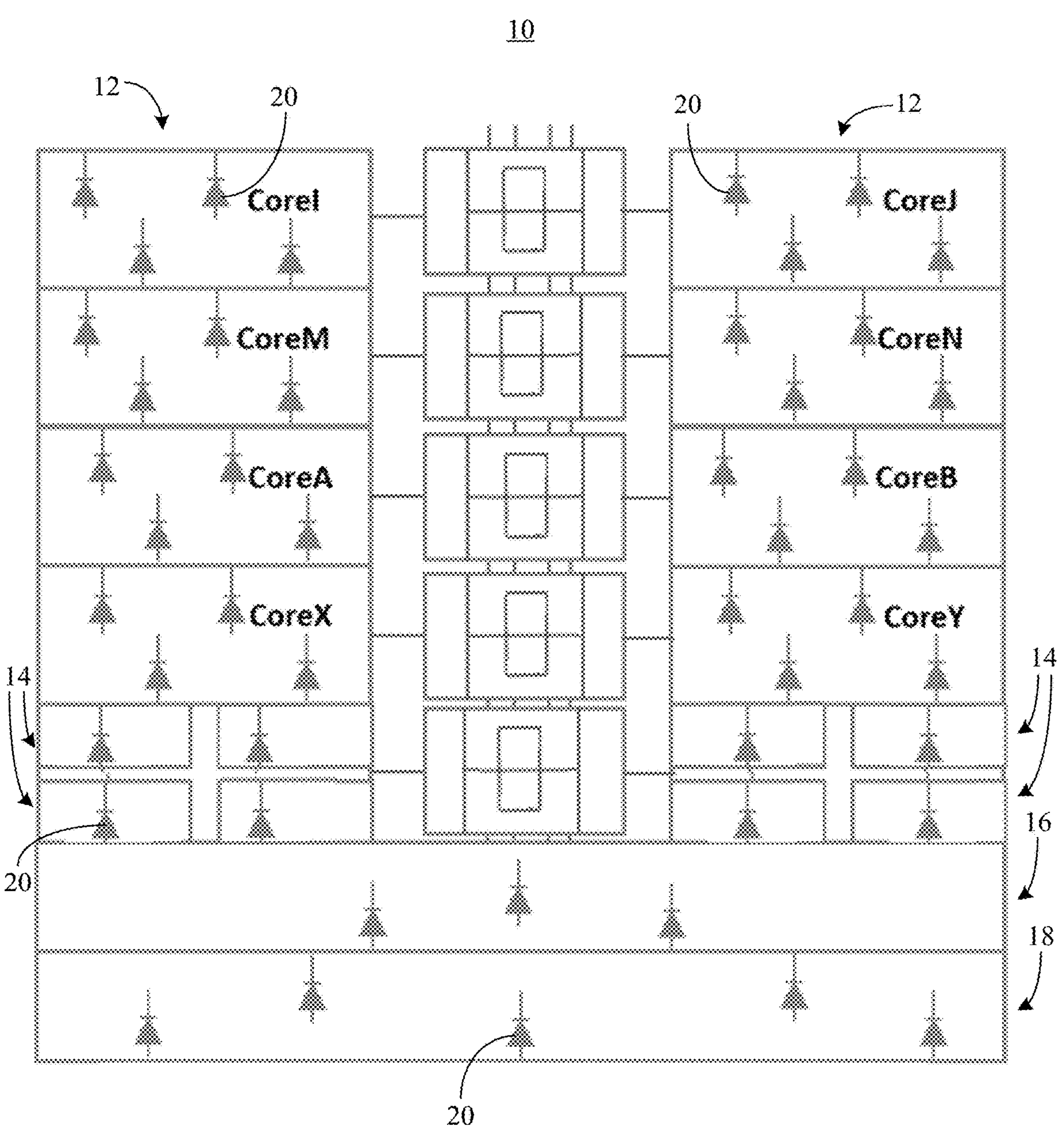
FIG. 1 is an illustration of an example of a microprocessor floorplan according to an embodiment.

Turning now to FIG. 1, a floorplan 10 of a microprocessor (e.g., multi-core hybrid processor) is shown in which high-performance cores 12 (e.g., "CoreL", "CoreM", "CoreA", "CoreX", "CoreJ", "CoreN", "CoreB", "CoreY"), high-efficiency cores 14, an "unslice" graphics region 16 (e.g., including graphics execution units/EUs such as compute and/or execution cores), and a "slice" graphics region 18 (e.g., including fixed-function and shared graphics hardware) are combined into a single die (e.g., semiconductor package). In the illustrated example, the high-performance cores 12, the high-efficiency cores 14, the unslice graphics region 16, and the slice graphics region 18 (e.g., collectively, operating regions) include digital thermal sensor (DTS) diodes 20 (e.g., positioned a few micrometers away from one another), wherein the DTS diodes 20 measure the temperature at the boundaries between the operating regions.

As will be discussed in greater detail, a "region cross heating" thermal threshold Ti [Ti<TjMax] is proposed for each operating region. Additionally, the priority of the operating regions may be determined based on an Energy-Performance Policy (EPP, e.g., load balancing data) and controlled by the hardware performance state of the operating regions. In the case of the high-performance cores 12 and the high-efficiency cores 14, priority may be determined by a Hardware Guided Scheduling (HGS) module based on efficiency data.

Figure 2:
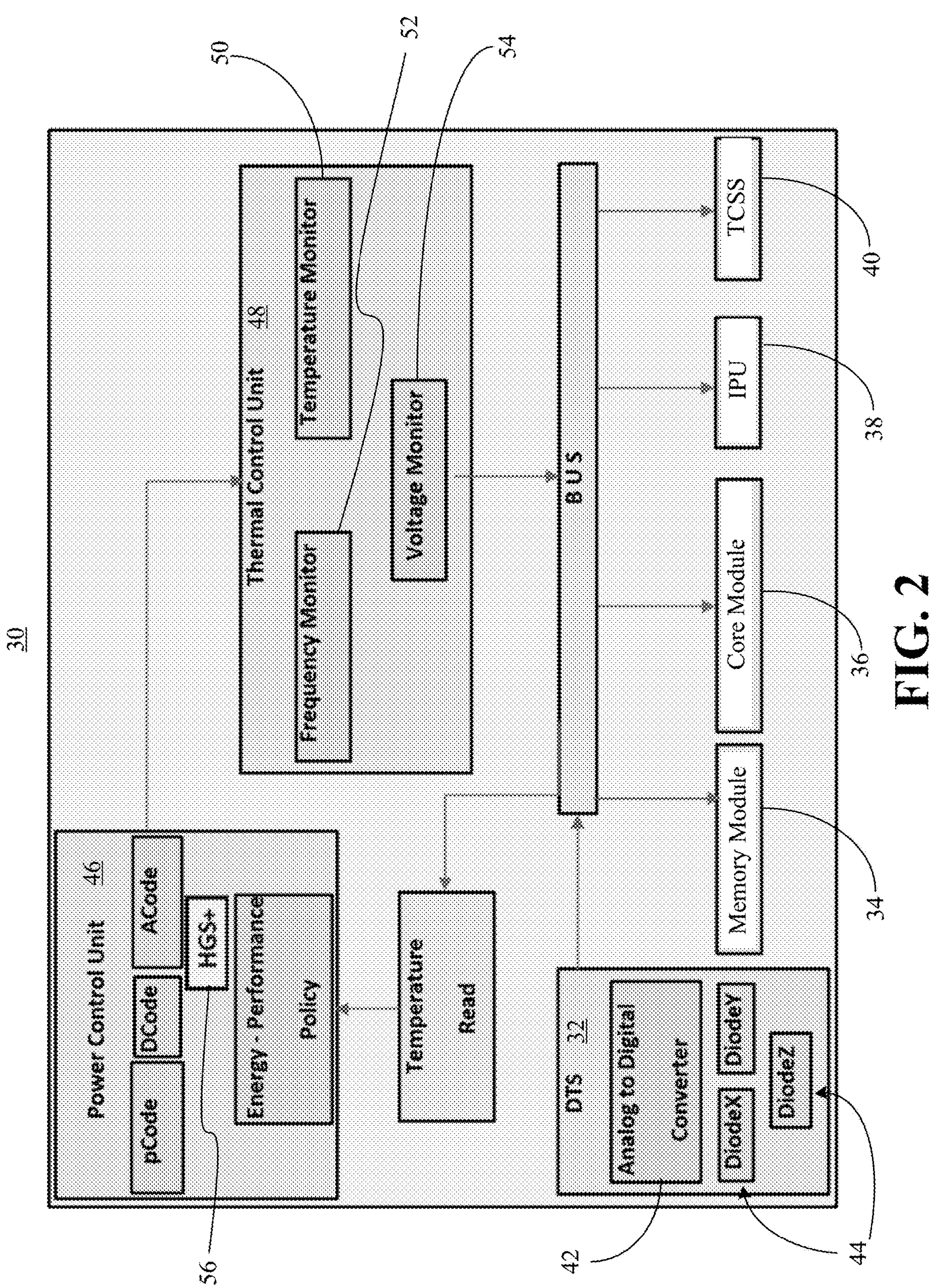
FIG. 2 is a block diagram of an example of hybrid microprocessor according to an embodiment.

FIG. 2 shows a multi-core hybrid microprocessor 30 configured to execute thermal control. A DTS 32 includes an analog to digital converter (ADC) 42 and diodes 44 ("DiodeX", "DiodeY", "DiodeZ", etc.), placed near the boundaries between a memory module 34, a core module 36 (e.g., including high-performance and high-efficiency cores), an image processing unit (IPU) 38, a Type-C Sub-system (TCSS) 40, etc., as well as other operating regions such as a cache-coherent fabric/ring, security region, and so forth. The temperature data captured by the diodes 44 is converted by the ADC 42. Each of the operating regions has an individual DTS 32 through which ACode, pCode and/or DCode of a power control unit (PCU) 46 calculate the temperature and facilitates appropriate thermal action in each operating region. In the illustrated example, however, only a single DTS 32 has been shown. A thermal control unit 48 includes a temperature monitoring unit 50 that compares the obtained temperature data with a predetermined temperature threshold to determine the start of thermal control. The thermal control unit 48 uses a frequency monitor 52 and/or a voltage monitor 54 to control the temperature of the operating regions by reducing frequency and/or voltage, respectively.

An energy—performance policy (EPP) is a load-balancing solution that is supported by the hardware P-state (performance state) of an operating region and helps operating regions to focus on performance. If the value of EPP is "0" for an operating region, the operating region will be executed in full performance mode (e.g., the core will be considered as higher priority).

When it comes to the cores, a hardware guided scheduling (HGS+) module 56 inside PCU 46 may be enhanced with INTEL THREAD DIRECTOR TECHNOLOGY. In such a case, the operating system receives assistance from hardware to identify which cores are most efficient in terms of either performance or power. Thus, HGS guides the OS scheduler in making correct decisions during scheduling, by providing hardware feedback on which cores are most efficient in power and performance at different platform, power, and thermal limits.

FIG. 3 shows a proximity data structure 60 that tracks the distance among the IP blocks ("IPs", e.g., operating regions), which can facilitate the selection of adjacent IPs. In one example, the distance data is stored in a memory module and IPs are micrometers away from one another. For example, IP0 module and IP1 module may have four high-efficiency cores in each module, and IP2 may have four high-performance cores within a module (e.g., CoreX, CoreY, CoreA, CoreB, etc.). Accordingly, Distance(0,3) in the first row of the proximity data structure 60 indicates the distance between IP03 of the IP0 module and IP20 of the IP2 module. The smaller the value, the less distance between the IPs. Thus, the least distance values are considered as the adjacent IPs.

Figures 4, 5:
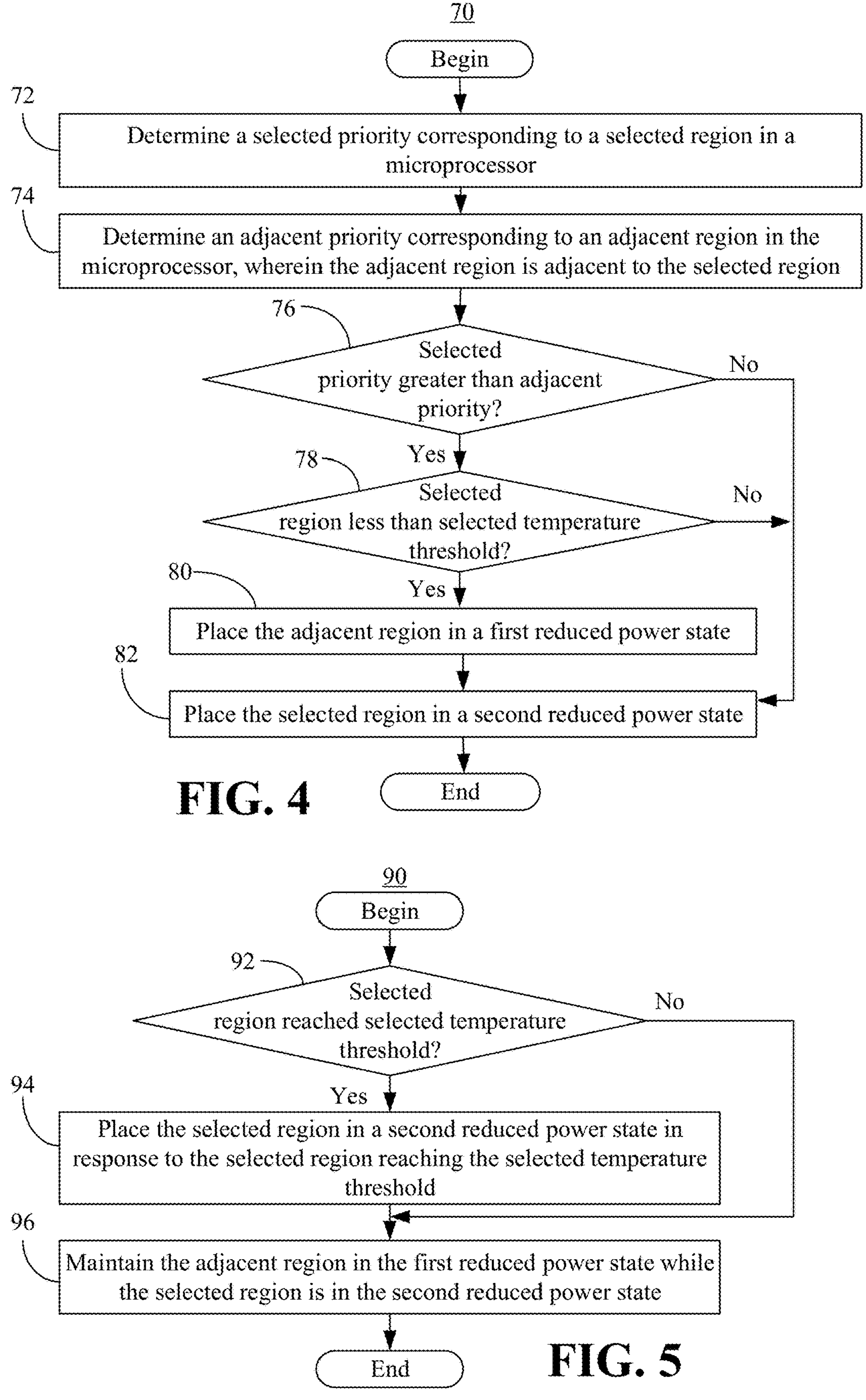
FIGS. 4 and 5 are flowcharts of examples of methods of operating a performance-enhanced microprocessor according to embodiments.

FIG. 4 shows a method 70 of operating a performance-enhanced microprocessor. The method 70 may generally be implemented in a microprocessor such as, for example, the multi-core hybrid microprocessor 30 (FIG. 2), already discussed. More particularly, the method 70 may be implemented in one or more modules a set of logic instructions stored in a machine- or computer-readable storage medium such as random access memory (RAM), read only memory (ROM), programmable ROM (PROM), firmware, flash memory, etc., in hardware, or any combination thereof. For example, hardware implementations may include configurable logic, fixed-functionality logic, or any combination thereof. Examples of configurable logic (e.g., configurable hardware) include suitably configured programmable logic arrays (PLAs), field programmable gate arrays (FPGAs), complex programmable logic devices (CPLDs), and general purpose microprocessors. Examples of fixed-functionality logic (e.g., fixed-functionality hardware) include suitably configured application specific integrated circuits (ASICs), combinational logic circuits, and sequential logic circuits. The configurable or fixed-functionality logic can be implemented with complementary metal oxide semiconductor (CMOS) logic circuits, transistor-transistor logic (TTL) logic circuits, or other circuits.

Computer program code to carry out operations shown in the method 70 can be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 72 provides for determining a selected priority corresponding to a selected region (e.g., selected IP block/core) in the microprocessor. Processing block 74 determines an adjacent priority corresponding to an adjacent region (e.g., adjacent IP block/core) in the microprocessor, wherein the adjacent region is adjacent to (e.g., shares a border with) the selected region. The selected priority and the adjacent priority may be determined based on one or more of load balancing data (e.g., EPP) or efficiency data (e.g., HGS). In one example, block 74 detects that the adjacent region is adjacent to the selected region based on a proximity data structure such as, for example, the proximity data structure 60 (FIG. 3).

A determination is made at processing block 76 as to whether the selected priority is greater than the adjacent priority. If so, processing block 78 determines (e.g., based on one or more DTS diode measurements) whether the temperature of the selected region is less than a selected temperature threshold (e.g., TjMax) associated with the selected region. If the selected region has not reached the selected temperature threshold, processing block 80 places the adjacent region in a first reduced power state. In an embodiment, processing block 80 involves reducing one or more of a frequency or a voltage of the adjacent region. Processing block 80 may also reduce an adjacent temperature threshold (e.g., TjMax) associated with the adjacent region to an intermediate temperature threshold (e.g., Ti). Illustrated processing block 82 places the selected region in a second reduced power state. If it is determined either at processing block 76 that the selected priority is not greater than the adjacent priority or at processing block 78 that the temperature of the selected region is not less than the selected temperature, the illustrated method 70 bypasses processing block 80 and proceeds to processing block 82. The method 70 may then terminate.

The method 70 therefore enhances performance at least to the extent that placing the adjacent region in the first reduced power state prevents the low-priority adjacent region from overheating the high-priority selected region. For example, the adjacent region could be executing a compute-intensive but low-priority workload while the selected region is executing a high-priority workload. In such a case, the method 70 may prevent voltage and/or frequency throttling in the selected region.

FIG. 5 shows another method 90 of operating a performance-enhanced microprocessor. The method 90 may generally be implemented in conjunction with the method 70 (FIG. 4) in a microprocessor such as, for example, the multi-core hybrid microprocessor 30 (FIG. 2), already discussed. More particularly, the method 90 may be implemented in one or more modules as a set of logic instructions stored in a machine- or computer-readable storage medium RAM, ROM, PROM, firmware, flash memory, etc., in hardware, or any combination thereof.

Illustrated processing block 92 determines (e.g., based on one or more DTS diode measurements) whether the temperature of the selected region has reached the selected temperature threshold (e.g., TjMax). If so, processing block 94 places the selected region in a second reduced power state in response to the selected region reaching the selected temperature threshold. In an embodiment, the second reduced power state consumes less power than the first reduced power state (e.g., the power reduction in the selected region is more aggressive than the power reduction in the adjacent region). Additionally, processing block 96 maintains the adjacent region in the first reduced power state while the selected region is in the second reduced power state. If it is determined at processing block 92 that the temperature of the selected region has not reached the selected temperature threshold, the illustrated method 90 bypasses processing block 94 and proceeds to processing block 96. The method 90 therefore further enhances performance by cooling down the selected region more quickly through the use of both the first reduce power state and the second reduced power state.

Figure 6A:
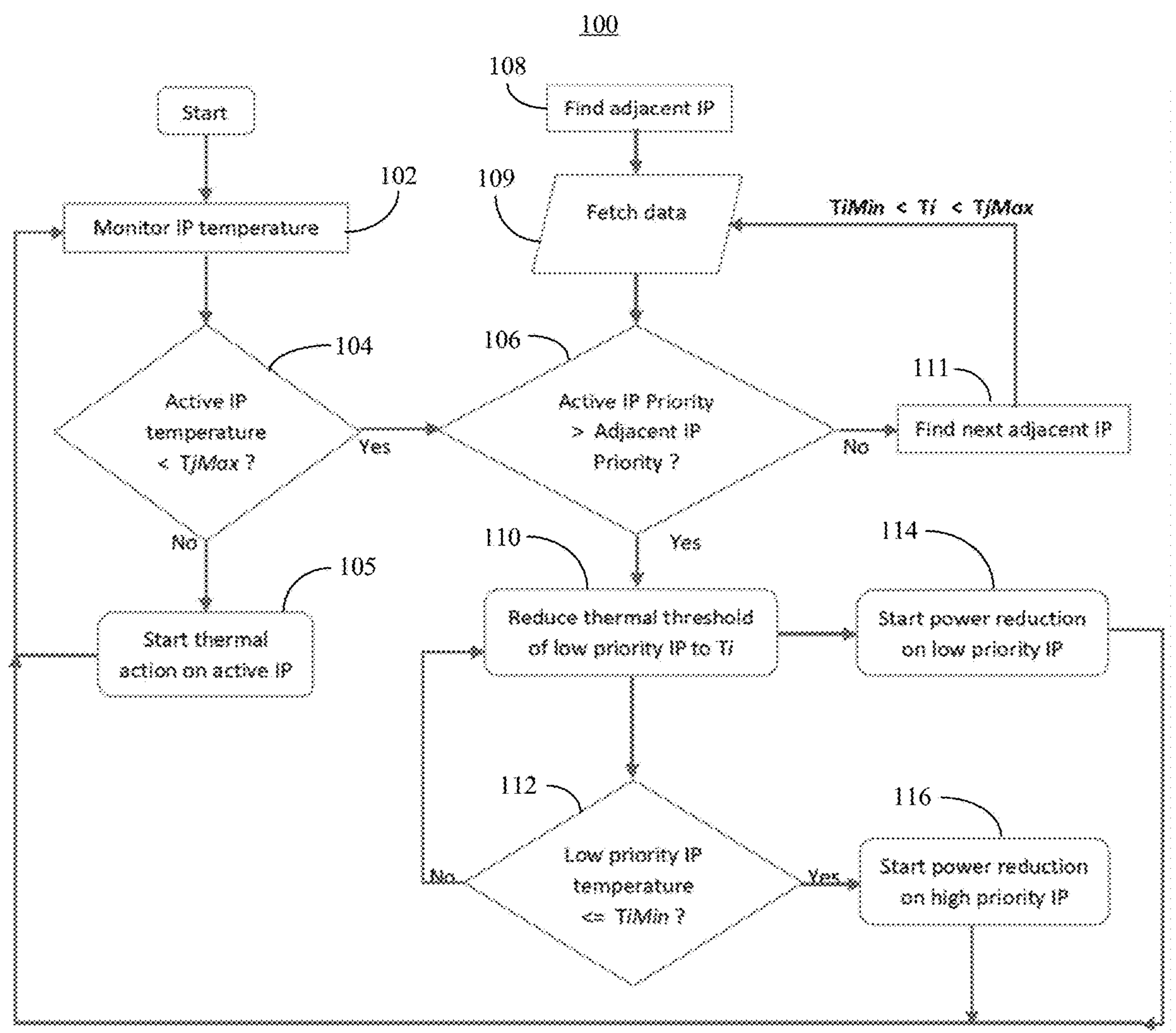
FIGS. 6A and 6B are flowcharts of examples of more detailed methods of operating a performance-enhanced microprocessor according to embodiments.

With continuing reference to FIGS. 1 and 6A, a more detailed method 100 of operating a performance-enhanced microprocessor is shown. The method 100 may generally be implemented in a microprocessor such as, for example, the multi-core hybrid microprocessor 30 (FIG. 2), already discussed. More particularly, the method 100 may be implemented in one or more modules as a set of logic instructions stored in a machine- or computer-readable storage medium RAM, ROM, PROM, firmware, flash memory, etc., in hardware, or any combination thereof.

Illustrated processing block 102 monitors IP temperature, wherein processing block 104 determines whether the active IP (e.g., selected region) temperature is less than TjMax (e.g., selected temperature threshold). If so, processing block 106 determines whether the active IP priority (e.g., selected priority) is greater than the adjacent IP priority (e.g., adjacent priority), wherein processing block 108 locates an adjacent IP and block 109 fetches data from the proximity data structure. If the active IP priority is greater than the adjacent IP priority, then processing block 110 reduces the thermal threshold of the low priority IP to Ti.

Each IP will have its own minimum “IP cross heating” thermal threshold TiMin. Once any IP reaches its minimum “IP cross heating” thermal threshold, thermal action will be taken even on higher priority IPs irrespective of their priority with appropriate hysteresis. Therefore, a determination may be made at processing block 112 as to whether the low priority IP temperature is less than or equal to TiMin. If not, the method 100 returns to processing block 110 and further reduces the thermal threshold of the low priority IP to Ti. Processing block 114 starts power reduction on the low priority IP and the method 100 returns to processing block 102. If it is determined either at processing block 106 that the active IP priority is not greater than the adjacent IP priority, block 111 selects the next adjacent IP and the method 100 returns to processing block 109. If it is determined at processing block 112 that the low priority IP temperature is not less than or equal to TiMin, processing block 116 starts power reduction on the high priority IP. If it is determined at processing block 104 that the active IP temperature is not less than TjMax, processing block 105 starts thermal action on the active IP.

Thus, if the operating region CoreB receives a higher priority to execute a task, the method 100 will read whether the adjacent operating region CoreY and/or the next adjacent operating region CoreN—priorities are higher than the CoreB priority. If the adjacent IP CoreN has a lower priority than CoreB, as a pre-emptive action, the method 100 reduces the power consumption of CoreN and its existing temperature threshold TjMax will also be reduced to the newly proposed “IP cross heating” thermal threshold Ti.

If, for example, CoreN was running at turbo frequency, CoreN will be reduced to the base frequency and if the TjMax value for CoreN was 100 degree Celsius (C), CoreN will be reduced to Ti [CoreN], which can be 95° C., so that CoreN can be throttled down much earlier and can create additional performance headroom for CoreB. If CoreN has a higher priority than the adjacent IP CoreJ but less priority than CoreB, the method 100 will reduce the power consumption of CoreJ and its existing temperature threshold TjMax will be reduced to the “IP cross heating” thermal threshold Ti [Ti [CoreJ]<Ti [CoreN]].

If CoreN starts consuming higher power than CoreJ but less power than CoreB, CoreJ will be reduced to the base frequency and if the TjMax value for CoreJ was 100° C., CoreJ will be reduced to Ti [CoreJ], which can be 90° C., so that CoreJ can be throttled down much earlier and can create additional performance headroom for CoreN.

If the CoreJ priority is the lowest, then its “IP cross heating” thermal threshold will be reduced until the minimum “IP cross heating” thermal threshold is TiMin [TiMin<Ti<TjMax]. Each IP will have its own minimum “IP cross heating” thermal threshold TiMin. Once any IP reaches its minimum “IP cross heating” thermal threshold, thermal action will be taken even on higher priority IPs irrespective of their priority with appropriate hysteresis. Relative priority of the work running on the different IPs will therefore create additional performance headroom on the higher-priority IPs.

Figure 6B:
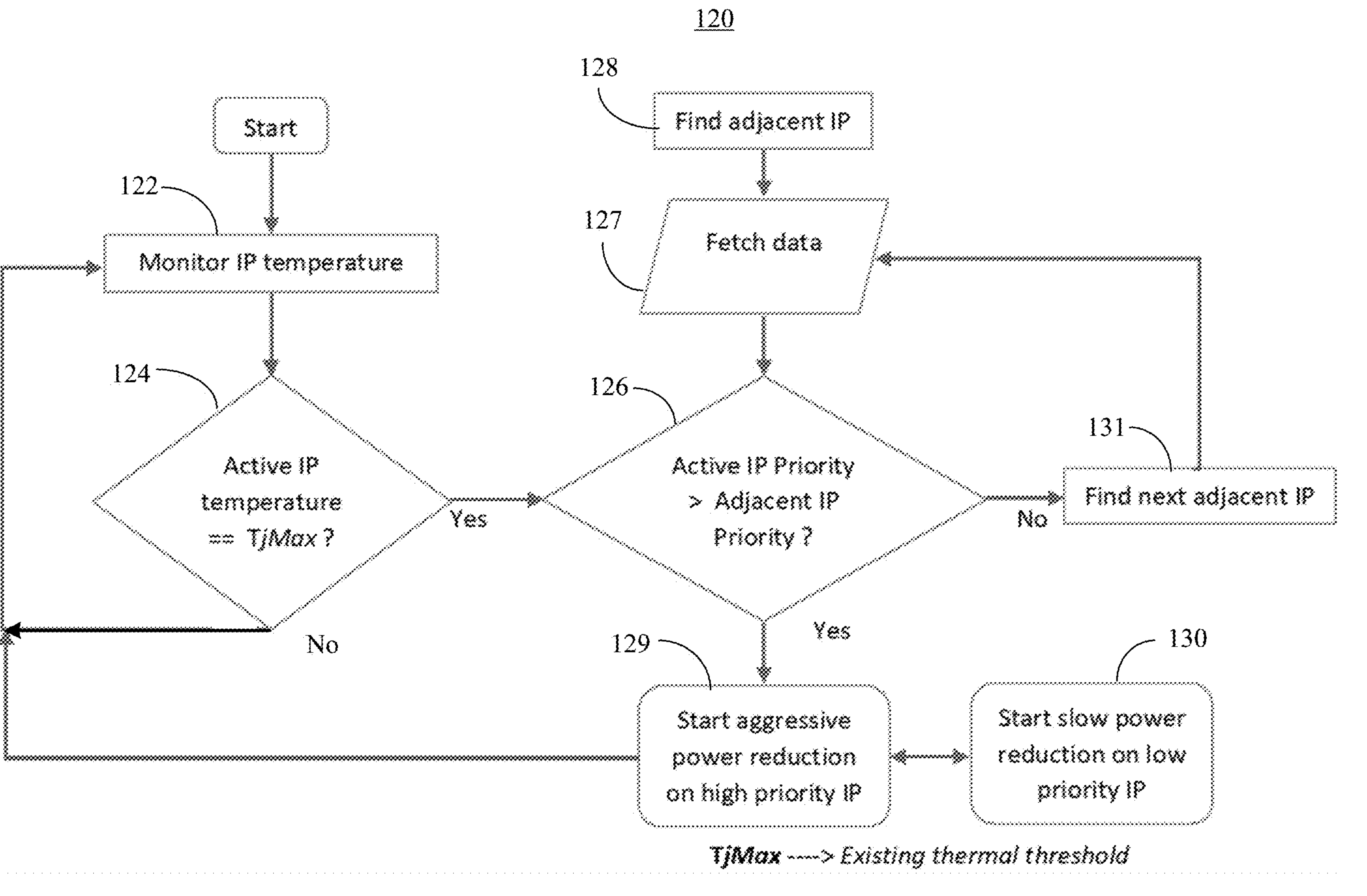

With continuing reference to FIGS. 1 and 6B, a more detailed method 120 of operating a performance-enhanced microprocessor is shown. The method 120 may generally be implemented in conjunction with the method 100 (FIG. 6A) in a microprocessor such as, for example, the multi-core hybrid microprocessor 30 (FIG. 2), already discussed. More particularly, the method 120 may be implemented in one or more modules as a set of logic instructions stored in a machine- or computer-readable storage medium RAM, ROM, PROM, firmware, flash memory, etc., in hardware, or any combination thereof.

Illustrated processing block 122 monitors IP temperature, wherein processing block 124 determines whether the active IP (e.g., selected region) temperature has reached TjMax (e.g., selected temperature threshold). If so, processing block 126 determines whether the active IP priority (e.g., selected priority) is greater than the adjacent IP priority (e.g., adjacent priority), wherein processing block 128 locates an adjacent IP and processing block 127 fetches data from the proximity data structure. If the active IP priority is greater than the adjacent IP priority, processing block 129 starts aggressive power reduction on the high priority IP. In parallel, processing block 130 starts slow power reduction on the low priority IP prior to proceeding to block 129. If it is determined at processing block 126 that the active IP priority is not greater than the adjacent IP priority, processing block 131 identifies the next adjacent IP and the method 120 returns to processing block 127.

Thus, if the IP CoreA reaches its existing threshold TjMax, while its adjacent IP CoreX is running at a higher frequency but less than the CoreA frequency, since the priority of CoreA is higher than CoreX, the method 120 will slowly reduce power on CoreX and aggressively reduce power on CoreA as well. As a result, the “hot” IP CoreA will become cold more quickly than CoreX and can return to the desired frequency more quickly. In an embodiment, the aggressiveness of power reduction is adjusted based on the relative priority of the work running on the different IPs, rather than having a single reaction solution.

Figure 7:
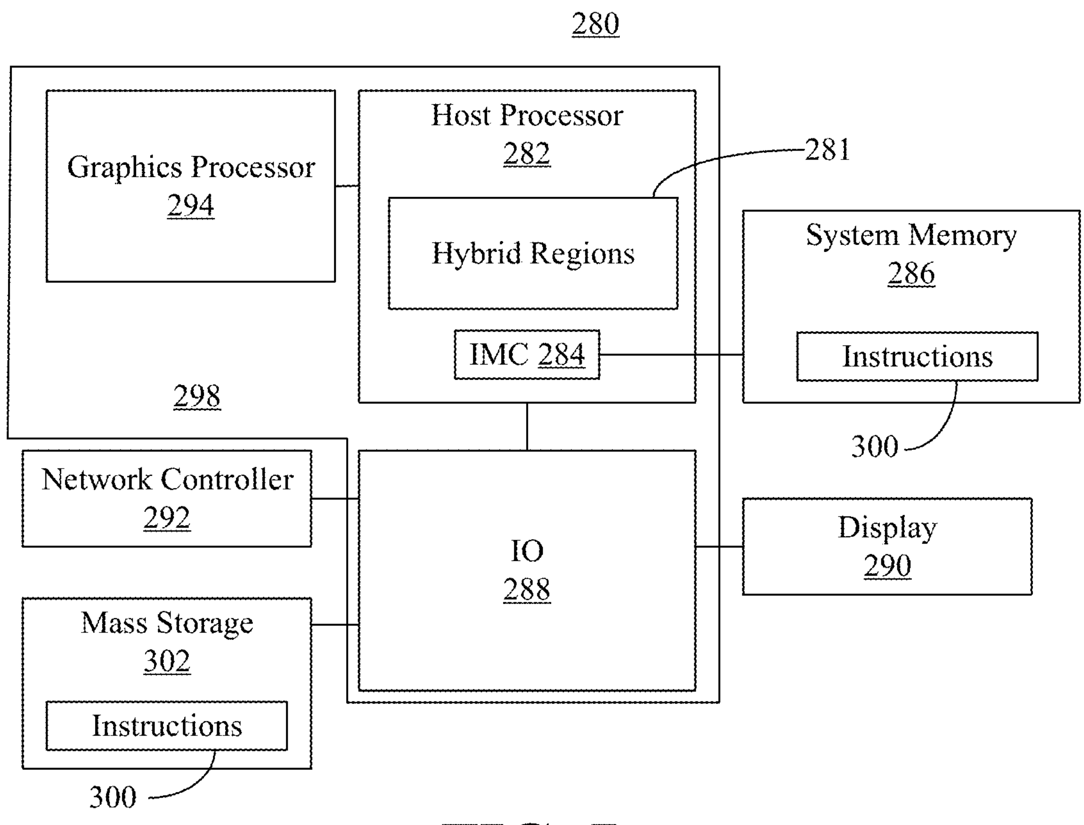
FIG. 7 is a block diagram of an example of a performance-enhanced computing system according to an embodiment.

Turning now to FIG. 7, a performance-enhanced computing system 280 is shown. The system 280 may generally be part of an electronic device/platform having computing functionality (e.g., personal digital assistant/PDA, notebook computer, tablet computer, convertible tablet, server), communications functionality (e.g., smart phone), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), robotic functionality (e.g., autonomous robot), Internet of Things (IoT) functionality, etc., or any combination thereof.

In the illustrated example, the system 280 includes a host processor 282 (e.g., central processing unit/CPU, microprocessor) having hybrid operating regions 281 (e.g., IP blocks, cores) and an integrated memory controller (IMC) 284 that is coupled to a system memory 286 (e.g., dual inline memory module/DIMM). In an embodiment, an IO (input/output) module 288 is coupled to the host processor 282. The illustrated IO module 288 communicates with, for example, a display 290 (e.g., touch screen, liquid crystal display/LCD, light emitting diode/LED display), mass storage 302 (e.g., hard disk drive/HDD, optical disc, solid state drive/SSD) and a network controller 292 (e.g., wired and/or wireless). The host processor 282 may be combined with the IO module 288, and a graphics processor 294 (e.g., including a slice graphics region and an unslice graphics region) into a system on chip (SoC) 298.

In an embodiment, the SoC 298 executes a set of instructions 300 retrieved from the system memory 286 and/or the mass storage 302 to perform one or more aspects of the method 70 (FIG. 4), the method 90 (FIG. 5), the method 100 (FIG. 6A) and/or the method 120 (FIG. 6B), already discussed. The instructions 300 may therefore cause the SoC 298 to determine a selected priority corresponding to a selected region in the SoC 298, determine an adjacent priority corresponding to an adjacent region in the SoC 298, wherein the adjacent region is adjacent to the selected region, and place the adjacent region in a first reduced power state if the selected priority is greater than the adjacent priority and the selected region has not reached a selected temperature threshold associated with the selected region.

The host processor 282, the graphics processor 294, the SoC 298 and/or the computing system 280 are therefore considered performance-enhanced at least to the extent that placing the adjacent region in the first reduced power state prevents the low-priority adjacent region from overheating the high-priority selected region. For example, the adjacent region could be executing a compute-intensive but low-priority workload while the selected region is executing a high-priority workload. In such a case, the instructions 300 may prevent voltage and/or frequency throttling in the selected region.

Figure 8:
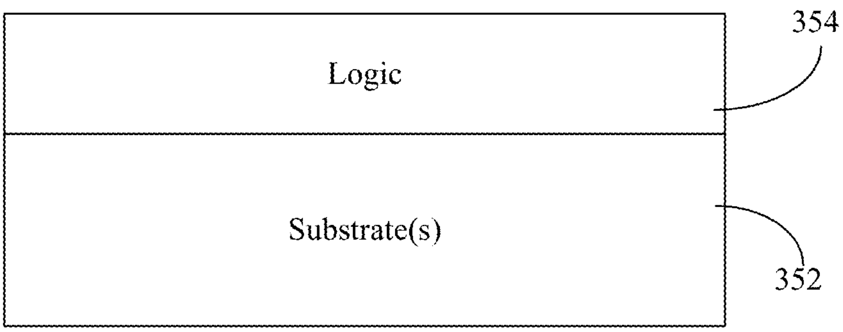
FIG. 8 is an illustration of an example of a semiconductor package apparatus according to an embodiment.

FIG. 8 shows a semiconductor apparatus 350 (e.g., chip, die, package). The illustrated apparatus 350 includes one or more substrates 352 (e.g., silicon, sapphire, gallium arsenide) and logic 354 (e.g., circuitry, transistor array and other integrated circuit/IC components) coupled to the substrate(s) 352. In an embodiment, the logic 354 implements one or more aspects of the method 70 (FIG. 4), the method 90 (FIG. 5), the method 100 (FIG. 6A) and/or the method 120 (FIG. 6B), already discussed.

The logic 354 may be implemented at least partly in configurable or fixed-functionality hardware. In one example, the logic 354 includes transistor channel regions that are positioned (e.g., embedded) within the substrate(s) 352. Thus, the interface between the logic 354 and the substrate(s) 352 may not be an abrupt junction. The logic 354 may also be considered to include an epitaxial layer that is grown on an initial wafer of the substrate(s) 352.

Figure 9:
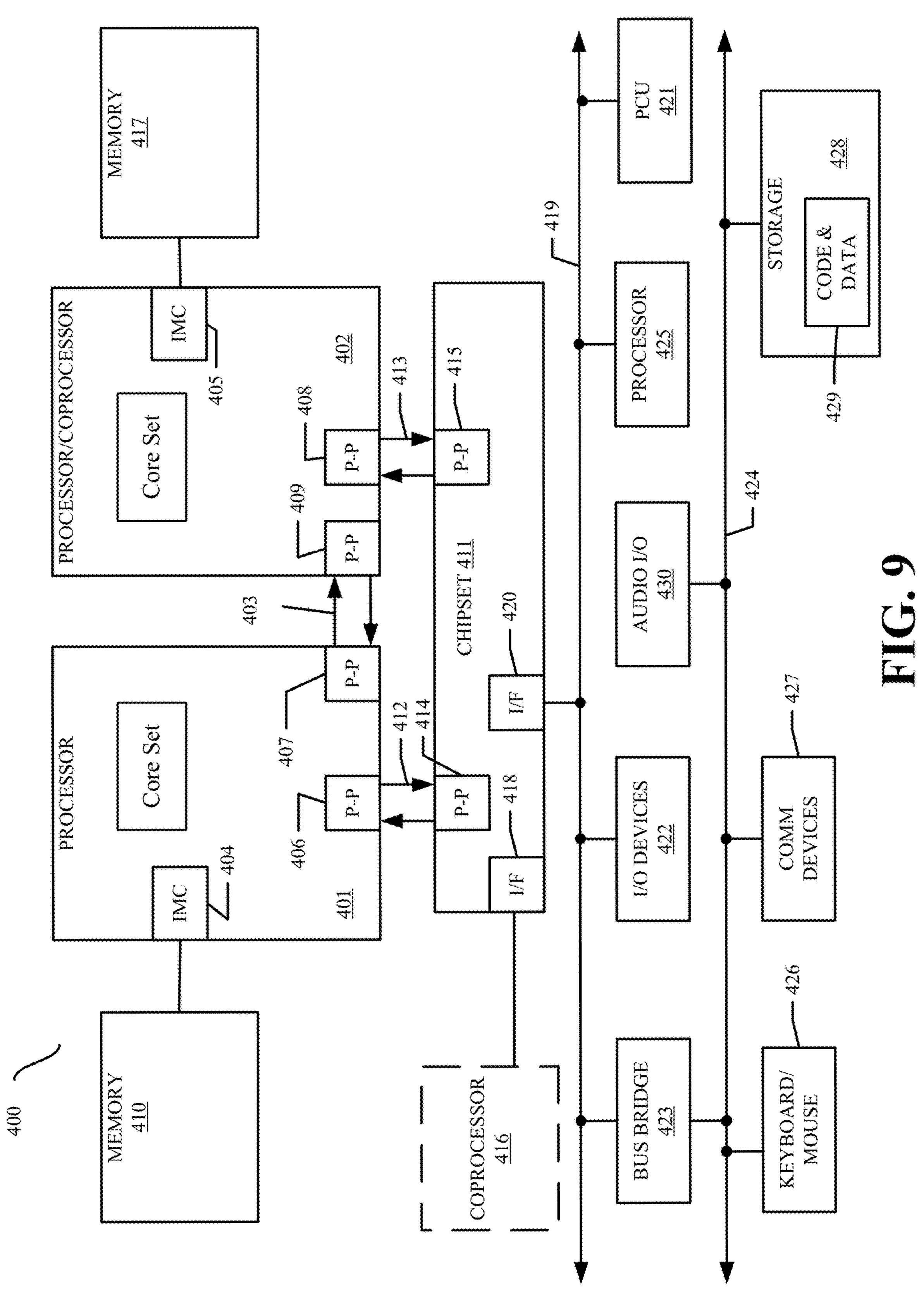
FIG. 9 is a block diagram of an example of a multiprocessor system according to an embodiment.

FIG. 9 shows a multiprocessor system 400 that is an interfaced system and includes a plurality of processors including a first processor 401 and a second processor 402 coupled to one another via an interface 403 such as a point-to-point (P-P) interconnect, a fabric, and/or bus. In some examples, the first processor 401 and the second processor 402 are homogeneous. In some examples, first processor 401 and the second processor 402 are heterogenous. Though the example system 400 is shown to have two processors, the system may have three or more processors, or may be a single processor system. In some examples, the computing system is implemented, wholly or partially, with a system on a chip (SoC) or a multi-chip (or multi-chiplet) module, in the same or in different package combinations.

Processors 401 and 402 are shown including integrated memory controller (IMC) circuitry 404 and 405, respectively. Processor 401 also includes interface circuits 406 and 407, along with core sets. Similarly, second processor 402 includes interface circuits 408 and 409, along with a core set as well. A core set generally refers to one or more compute cores that may or may not be grouped into different clusters, hierarchal groups, or groups of common core types. Cores may be configured differently for performing different functions and/or instructions at different performance and/or power levels. The processors may also include other blocks such as memory and other processing unit engines.

Processors 401, 402 may exchange information via the interface 403 using interface circuits 407, 409. IMC circuitry 404 and 405 couple the processors 401, 402 to respective memories, namely a memory 410 and a memory 417, which may be portions of main memory locally attached to the respective processors.

Processors 401, 402 may each exchange information with a network interface (NW I/F) 411 via individual interfaces 412, 413 using interface circuits 406, 414, 408, 415. The network interface 411 (e.g., one or more of an interconnect, bus, and/or fabric, and in some examples is a chipset) may optionally exchange information with a coprocessor 416 via an interface circuit 418. In some examples, the coprocessor 416 is a special-purpose processor, such as, for example, a high-throughput processor, a network or communication processor, compression engine, graphics processor, general purpose graphics processing unit (GPGPU), neural-network processing unit (NPU), embedded processor, or the like.

A shared cache (not shown) may be included in either processor 401, 402 or outside of both processors, yet connected with the processors 401, 402 via an interface such as P-P interconnect, such that local cache information of either or both processors 401, 402 may be stored in the shared cache if a processor is placed into a low power mode.

Network interface 411 may be coupled to a first interface 419 via interface circuit 420. In some examples, first interface 419 may be an interface such as a Peripheral Component Interconnect (PCI) interconnect, a PCI Express interconnect, or another I/O interconnect. In some examples, first interface 419 is coupled to a power control unit (PCU) 421, which may include circuitry, software, and/or firmware to perform power management operations with regard to the processors 401, 402 and/or co-processor 416. PCU 421 provides control information to one or more voltage regulators (not shown) to cause the voltage regulator(s) to generate the appropriate regulated voltage(s). PCU 421 also provides control information to control the operating voltage generated. In various examples, PCU 421 may include a variety of power management logic units (circuitry) to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software).

PCU 421 is illustrated as being present as logic separate from the processor 401 and/or processor 402. In other cases, PCU 421 may execute on a given one or more of cores (not shown) of processor 401 or 402. In some cases, PCU 421 may be implemented as a microcontroller (dedicated or general-purpose) or other control logic configured to execute its own dedicated power management code, sometimes referred to as P-code. In yet other examples, power management operations to be performed by PCU 421 may be implemented externally to a processor, such as by way of a separate power management integrated circuit (PMIC) or another component external to the processor. In yet other examples, power management operations to be performed by PCU 421 may be implemented within BIOS or other system software. Along these lines, power management may be performed in concert with other power control units implemented autonomously or semi-autonomously, e.g., as controllers or executing software in cores, clusters, IP blocks and/or in other parts of the overall system.

Various I/O devices 422 may be coupled to first interface 419, along with a bus bridge 423 which couples first interface 419 to a second interface 424. In some examples, one or more additional processor(s) 425, such as coprocessors, high throughput many integrated core (MIC) processors, GPGPUs, accelerators (such as graphics accelerators or digital signal processing (DSP) units), field programmable gate arrays (FPGAs), or any other processor, are coupled to first interface 419. In some examples, second interface 424 may be a low pin count (LPC) interface. Various devices may be coupled to second interface 424 including, for example, a keyboard and/or mouse 426, communication devices 427 and storage circuitry 428. Storage circuitry 428 may be one or more non-transitory machine-readable storage media as described below, such as a disk drive or other mass storage device which may include instructions/code and data 429. In an embodiment, the processors 401, 402 execute the instructions/code and data 429 to implement one or more aspects of the method 70 (FIG. 4), the method 90 (FIG. 5), the method 100 (FIG. 6A) and/or the method 120 (FIG. 6B), already discussed. Further, an audio I/O 430 may be coupled to second interface 424. Note that other architectures than the point-to-point architecture described above are possible. For example, instead of the point-to-point architecture, a system such as multiprocessor system 400 may implement a multi-drop interface or other such architecture.

Example Core Architectures, Processors, and Computer Architectures.

Processor cores may be implemented in different ways, for different purposes, and in different processors. For instance, implementations of such cores may include: 1) a general purpose in-order core intended for general-purpose computing; 2) a high-performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput) computing. Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip (SoC), apparatus and/or system that may be included on the same die as the described CPU (sometimes referred to as the application core(s) or application processor (s)), the above described coprocessor, and additional functionality.

ADDITIONAL NOTES AND EXAMPLES

Example 1 includes an apparatus comprising one or more substrates, and circuitry coupled to the one or more substrates, wherein the circuitry is implemented at least partly in one or more of configurable or fixed-functionality hardware, the circuitry to determine a selected priority corresponding to a selected region in the microprocessor, determine an adjacent priority corresponding to an adjacent region in the microprocessor, wherein the adjacent region is adjacent to the selected region, and place the adjacent region in a first reduced power state if the selected priority is greater than the adjacent priority and a temperature of the selected region is less than a selected temperature threshold associated with the selected region.

Example 2 includes the apparatus of Example 1, wherein the circuitry is further to detect that the temperature of the selected region has reached the selected temperature threshold, place the selected region in a second reduced power state in response to the temperature of the selected region reaching the selected temperature threshold, and maintain the adjacent region in the first reduced power state while the selected region is in the second reduced power state.

Example 3 includes the apparatus of Example 2, wherein the second reduced power state consumes less power than the first reduced power state.

Example 4 includes the apparatus of Example 1, wherein the selected priority and the adjacent priority are determined based on one or more of load balancing data or efficiency data.

Example 5 includes the apparatus of Example 1, wherein the circuitry is further to detect that the adjacent region is adjacent to the selected region based on a proximity data structure.

Example 6 includes the apparatus of Example 1, wherein to place the adjacent region in the first reduced power state, the circuitry is to reduce a frequency of the adjacent region.

Example 7 includes the apparatus of Example 1, wherein to place the adjacent region in the first reduced power state, the circuitry is to reduce a voltage of the adjacent region.

Example 8 includes the apparatus of any one of Examples 1 to 7, wherein the circuitry is further to reduce an adjacent temperature threshold associated with the adjacent region to an intermediate temperature threshold.

Example 9 includes the apparatus of any one of Examples 1 to 8, further including a network controller.

Example 10 includes at least one computer readable comprising a set of instructions, which when executed by a microprocessor, cause the microprocessor to determine a selected priority corresponding to a selected region in the microprocessor, determine an adjacent priority corresponding to an adjacent region in the microprocessor, wherein the adjacent region is adjacent to the selected region, and place the adjacent region in a first reduced power state if the selected priority is greater than the adjacent priority and the selected region has not reached a selected temperature threshold associated with the selected region.

Example 11 includes the at least one computer readable storage medium of Example 10, wherein the instructions, when executed, further cause the microprocessor to detect that the selected region has reached the selected temperature threshold, place the selected region in a second reduced power state in response to the selected region reaching the selected temperature threshold, and maintain the adjacent region in the first reduced power state while the selected region is in the second reduced power state.

Example 12 includes the at least one computer readable storage medium of Example 11, wherein the second reduced power state consumes less power than the first reduced power state.

Example 13 includes the at least one computer readable storage medium of Example 10, wherein the selected priority and the adjacent priority are determined based on one or more of load balancing data or efficiency data.

Example 14 includes the at least one computer readable storage medium of Example 10, wherein the instructions, when executed, further cause the microprocessor to detect that the adjacent region is adjacent to the selected region based on a proximity data structure.

Example 15 includes the at least one computer readable storage medium of Example 10, wherein to place the adjacent region in the first reduced power state, the instructions are to reduce one or more of a frequency or a voltage of the adjacent region.

Example 16 includes the at least one computer readable storage medium of any one of Examples 10 to 15, wherein the instructions, when executed, further reduce an adjacent temperature threshold associated with the adjacent region to an intermediate temperature threshold.

Example 17 includes a method comprising determining a selected priority corresponding to a selected region in a microprocessor, determining an adjacent priority corresponding to an adjacent region in the microprocessor, wherein the adjacent region is adjacent to the selected region, and placing the adjacent region in a first reduced power state if the selected priority is greater than the adjacent priority and a temperature of the selected region is less than a selected temperature threshold associated with the selected region.

Example 18 includes the method of Example 17, further comprising detecting that the temperature of the selected region has reached the selected temperature threshold, placing the selected region in a second reduced power state in response to the temperature of the selected region reaching the selected temperature threshold, and maintaining the adjacent region in the first reduced power state while the selected region is in the second reduced power state.

Example 19 includes the method of Example 18, wherein the second reduced power state consumes less power than the first reduced power state.

Example 20 includes the method of any one of Examples 17 to 19, wherein the selected priority and the adjacent priority are determined based on one or more of load balancing data or efficiency data.

Example 21 includes an apparatus comprising means for performing the method of any one of Example 17 to 20.

The technology described herein also improves the performance of affected operating regions with additional thermal headroom when thermal interference from adjacent operating regions is present.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An apparatus comprising:

one or more substrates; and circuitry coupled to the one or more substrates, wherein the circuitry is implemented at least partly in one or more of configurable or fixed-functionality hardware, the circuitry to:

determine a selected priority corresponding to a selected region in the microprocessor;

determine an adjacent priority corresponding to an adjacent region in the microprocessor, wherein the adjacent region is adjacent to the selected region; and place the adjacent region in a first reduced power state if the selected priority is greater than the adjacent priority and a temperature of the selected region is less than a selected temperature threshold associated with the selected region.

2. The apparatus of claim 1, wherein the circuitry is further to:

detect that the temperature of the selected region has reached the selected temperature threshold;

place the selected region in a second reduced power state in response to the temperature of the selected region reaching the selected temperature threshold; and maintain the adjacent region in the first reduced power state while the selected region is in the second reduced power state.

3. The apparatus of claim 2, wherein the second reduced power state consumes less power than the first reduced power state.

4. The apparatus of claim 1, wherein the selected priority and the adjacent priority are determined based on one or more of load balancing data or efficiency data.

5. The apparatus of claim 1, wherein the circuitry is further to detect that the adjacent region is adjacent to the selected region based on a proximity data structure.

6. The apparatus of claim 1, wherein to place the adjacent region in the first reduced power state, the circuitry is to reduce a frequency of the adjacent region.

7. The apparatus of claim 1, wherein to place the adjacent region in the first reduced power state, the circuitry is to reduce a voltage of the adjacent region.

8. The apparatus of claim 1, wherein the circuitry is further to reduce an adjacent temperature threshold associated with the adjacent region to an intermediate temperature threshold.

9. The apparatus of claim 1, further including a network controller.

10. At least one non-transitory computer readable storage medium comprising a set of instructions, which when executed by a microprocessor, cause the microprocessor to: determine a selected priority corresponding to a selected region in the microprocessor; determine an adjacent priority corresponding to an adjacent region in the microprocessor, wherein the adjacent region is adjacent to the selected region; and place the adjacent region in a first reduced power state if the selected priority is greater than the adjacent priority and the selected region has not reached a selected temperature threshold associated with the selected region.

11. The at least one non-transitory computer readable storage medium of claim 10, wherein the instructions, when executed, further cause the microprocessor to: detect that the selected region has reached the selected temperature threshold; place the selected region in a second reduced power state in response to the selected region reaching the selected temperature threshold; and maintain the adjacent region in the first reduced power state while the selected region is in the second reduced power state.

12. The at least one non-transitory computer readable storage medium of claim 11, wherein the second reduced power state consumes less power than the first reduced power state.

13. The at least one non-transitory computer readable storage medium of claim 10, wherein the selected priority and the adjacent priority are determined based on one or more of load balancing data or efficiency data.

14. The at least one non-transitory computer readable storage medium of claim 10, wherein the instructions, when executed, further cause the microprocessor to detect that the adjacent region is adjacent to the selected region based on a proximity data structure.

15. The at least one non-transitory computer readable storage medium of claim 10, wherein to place the adjacent region in the first reduced power state, the instructions are to reduce one or more of a frequency or a voltage of the adjacent region.

16. The at least one non-transitory computer readable storage medium of claim 10, wherein the instructions, when executed, further reduce an adjacent temperature threshold associated with the adjacent region to an intermediate temperature threshold.

17. A method comprising:

determining a selected priority corresponding to a selected region in a microprocessor;

determining an adjacent priority corresponding to an adjacent region in the microprocessor, wherein the adjacent region is adjacent to the selected region; and placing the adjacent region in a first reduced power state if the selected priority is greater than the adjacent priority and a temperature of the selected region is less than a selected temperature threshold associated with the selected region.

18. The method of claim 17, further comprising:

detecting that the temperature of the selected region has reached the selected temperature threshold;

placing the selected region in a second reduced power state in response to the temperature of the selected region reaching the selected temperature threshold; and maintaining the adjacent region in the first reduced power state while the selected region is in the second reduced power state.

19. The method of claim 18, wherein the second reduced power state consumes less power than the first reduced power state.

20. The method of claim 17, wherein the selected priority and the adjacent priority are determined based on one or more of load balancing data or efficiency data.

* * * * *